United States Patent [19]
Dohse et al.

[11] 3,946,822
[45] Mar. 30, 1976

[54] TRACKLAYING VEHICLE COMPRISING FOUR TRACKLAYING UNITS

[75] Inventors: Jurgen Dohse; Klaus Klucker, both of Lubeck, Germany

[73] Assignee: O & K Orenstein & Koppel Aktiengesellschaft, Germany

[22] Filed: Dec. 20, 1974

[21] Appl. No.: 534,889

[30] Foreign Application Priority Data
Dec. 21, 1973 Germany............................ 2363755

[52] U.S. Cl............. 180/9.46; 280/111; 180/79.2 R
[51] Int. Cl.² ........................................ B62D 11/20
[58] Field of Search .......... 280/109, 111; 180/9.46, 180/9.48, 9, 9.44, 79.2 R

[56] References Cited
UNITED STATES PATENTS
3,408,089 10/1968 Edwards ............................. 280/111
3,792,745 2/1974 Files.................................. 180/9.46

Primary Examiner—Philip Goodman
Attorney, Agent, or Firm—McGlew and Tuttle

[57] ABSTRACT

A tracklaying vehicle comprises first and second laterally spaced tracklaying units which are spaced apart in a travel direction from third and fourth tracklaying units which are spaced laterally from each other. A substructure which is supported on and located in between the tracklaying units includes a carrier shaft extending in the travel direction which provides a journal for rotatably mounting a cross beam which extends between one set of the tracklaying units, for example, the first and second tracklaying units. The other set of tracklaying units, the third and fourth one, are designed as steering units, and they are mounted on individual arms which are pivotally mounted on vertical pivots of the substructure and which are connected to steering devices for pivoting them about the rotatable mountings on each side of the substructure in order to shift the position of the third and fourth tracklaying units.

4 Claims, 3 Drawing Figures

TRACKLAYING VEHICLE COMPRISING FOUR TRACKLAYING UNITS

BACKGROUND OF THE INVENTION

This invention relates, in general, to the construction of tracklaying devices and, in particular, to a new and useful tracklaying vehicle, comprising four tracklaying units.

DESCRIPTION OF THE PRIOR ART

Tracklaying units are known which includes a stirring mechanism for four tracklaying units and in which two tracklaying units, operating side by side, are connected to each other by means of a cross beam which is pivotable about a vertical axis and supports the superstructure of the vehicle. They are orientable through a steering lever by means of a screw spindle gear. With such a construction, the cross beam by which the stirrable front tracklaying units are connected and upon which the stirring lever acts to affect the steering, is connected to the superstructure by means of a ball joint. The screw spindle is mounted on the cross beam of the rear tracklaying units and it is made fast to the superstructure. With such a design, the entire steering mchanism is disposed below the supporting structure of the vehicle which is carried by the tracklaying units. This results in a disadvantage of a relatively high center of gravity of the whole vehicle. Vehicles equipped with booms have the additional disadvantage that if work is to be done at the level of the undercarriage, the booms must be correspondingly longer because of the high supporting structure.

Also known is a supporting and steering device for tracklaying vehicles which comprises one or more steerable track guide frames, and in which the undercarriage rests on each of these guide frames by means of a pivotal supporting member which acts unilaterally on the respective track frame and which forms the horizontal pivot of the guide frame and is horizontally guided on the undercarriage.

SUMMARY OF THE INVENTION

This invention provides a tracklaying vehicle which comprises four tracklaying units which can be steered in a manner as simple as possible and has a small overall height as well as a simple, weight-saving structure. In accordance with the invention, the substructure is mounted entirely or partly in the space between the four tracklaying units and is pivotally supported on a crossbeam connecting two of the tracklaying units by means of a carrying beam or support shaft which extends in the travel direction.

The inventive construction offers the advantage of a low center of gravity and a small overall height of the substructure and, consequently, smaller total height of the entire device. Therefore, shorter and lighter booms can be used. In addition, the total weight of the device is thereby reduced. According to a development of the invention, the two other tracklaying units may be designed as steering units which are pivotable about a vertical axis of the substructure. The steering tracklaying units may be of various design. A simple design provides that the two steering tracklaying units are pivotally mounted about a common vertical axis. In accordance with a further development of the invention and to further simplify the steering of the device, the steering tracklaying units may comprise a supporting arm which is connected to a track frame and pivotally supported on the substructure and which, at its end remote from the track frame, is supported on the substructure through a slide guide and connected to the substructure through a steering mechanism acting on this end. Such a construction offers the combination of small steering angles with good maneuverability. In consequence, the tracklaying units can be mounted close to the substructure with the result of saving in weight.

Accordingly, it is an object of the invention to provide a tracklaying vehicle which includes two sets of tracklaying units with a substructure arranged therebetween and having a carrier shaft extending in the travel direction which pivotally supports a cross beam connected at its respective ends to each of the tracklaying units of a first set or the other tracklaying units of the other set connected to respective carrier beams which are pivotally mounted about vertical axes on each side of the substructure and which may be shifted for the purposes of steering the vehicle.

A further object of the invention is to provide a tracklaying vehicle having a relatively low profile and which is simple in design, rugged in construction and economical to manufacture.

For an understanding of the principles of the invention, reference is made to the following description of typical embodiments thereof as illustrated in the accompanying drawing.

GENERAL DESCRIPTION OF THE PREFERRED EMBODIMENT

Figure 1:
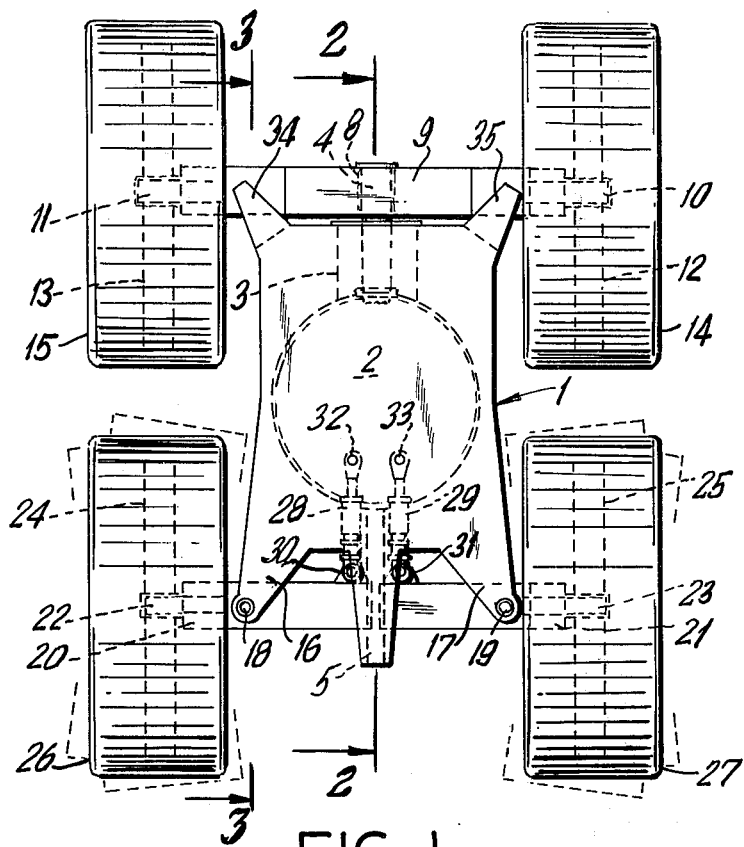
FIG. 1 is a top plan view of a tracklaying vehicle constructed in accordance with the invention.

Referring to the drawings, in particular, the invention embodied therein, comprises a tracklaying vehicle which includes a substructure generally designated 1 which includes a central cylindrical part 2 and which is provided with a carrier shaft which extends in the travel direction and is located centrally between a first set of first and second tracklaying units 14 and 15. The carrier shaft 4 extends through a bearing 8 of a cross beam 9 so as to rotatably support the crossbeam thereon. The limit of pivotal or rotative movement of the crossbeam is defined by outwardly extending cantilever arms 34 and 35 of the substructure. The carrier beam is provided with a journal 10 at one end and a journal 11 at the opposite end for supporting track frames 12 and 13 of the respective tracklaying units 14 and 15. The two tracklaying units 14 and 15 are capable of swinging commonly about the carrier shaft 4 and thereby about the substructure 1, and each is capable of separate pivotal movement about the journal 10 and 11, which extends transverse to the travel direction. The substructure 1 is also provided with a central portion 5 which extends forwardly. Two slide guides 6 and 7 are mounted, one above the other, on the structure 5. The substructure 1 also is provided with two laterally extending supporting brackets 16 and 17 on respective sides which are pivoted to respective supporting arms 20 and 21 by means of vertical pivots 18 and 19 respectively. Such a connection offers a single degree of freedom, that is, pivotal movement about a vertical axis. The construction may also be be made with a universal or ball joint at such location where further pivotal movement is desired.

The exteriors of the supporting arms 20 and 21 are provided with journals 22 and 23, respectively for the pivotal mounting of a second set of third and fourth track frame 24 and 25 which are part of tracklaying units 26 and 27. The free ends of the supporting arms 20 and 21 extend into slide guides 6 and 7 and they, in turn, are part of a steering mechanism 28 and 29 which include fluid pressure operated cylinders or similar fluid drive motors for pivoting the respective arms 20 and 21 about the respective pivots 18 and 19. Pivotal pin connections 30 and 31 permit horizontal pivoting and this drive mechanism 28 and 29 are pivotally mounted on the substructure 1 by means of pivots 32 and 33.

Figure 2:
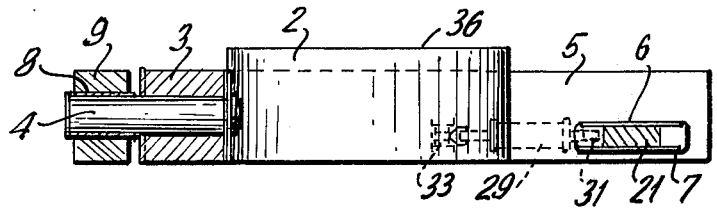
FIG. 2 is a section taken along the line 2—2 of FIG. 1.
Figure 3:
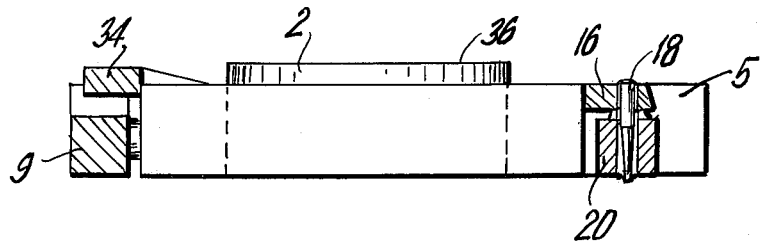
FIG. 3 is a section taken along the line 3—3 of FIG. 1.

As shown in FIGS. 2 and 3, the substructure is entirely or partly disposed in the zone of the tracklaying units 14, 15, 26, 27 and between crossbeam 9 and the supporting arms 20 and 21. Thus, the substructure 1 is mounted so that it is very low. On its upper side 36, the substructure 1 is provided, for example, with a support assembly (not shown) such as a ball-bearing slewing gear for the superstructure which is also not shown.

At the side of the crossbeam 9, the substructure 1 is further provided with two cantilever arms 34 and 5 which extend in a position above and spaced from crossbeam 9 so that an excessive inclination of the crossbeam 9 is prevented.

With the vehicle of the invention having the two tracklaying units 26 and 27, any desired steering motion can be carried out. As a rule, the two tracklaying units 26, 27 are adjusted so as to perform a parallel motion.

While a specific embodiment of the invention has been shown and described in detail to illustrate the application of the principles of the invention, it will be understood that the invention may be embodied otherwise without departing from such principles.

What is claimed is:

1. A tracklaying vehicle comprising first and second laterally spaced tracklaying units, third and fourth laterally spaced tracklaying units spaced longitudinally from said first and second tracklaying units, a substructure supported on said tracklaying units and mounted between said first and second and third and fourth units, a longitudinally extending carrier shaft on said substructure, a crossbeam having a bore receiving said carrier shaft, said crossbeam being rotatably mounted on said carrier shaft between said first and second tracklaying units and interconnecting said first and second tracklaying units, said first and second tracklaying units being pivotally supported adjacent respective ends of said crossbeam for pivotal movement about a horizontal axis, said crossbeam being pivotable with said first and second tracklaying units about said longitudinally extending carrier shaft, and support means for pivotaly supporting said third and fourth tracklaying units on said substructure so that the units may be pivoted only about a substantially verfical axis for steering the vehicle.

2. A tracklaying unit according to claim 1, said support means including an arm pivotally mounted on said substructure adjacent each side and adjacent each of said third and fourth tracklaying units respectively, said arms having outer ends having journals pivotally supporting said tracklaying units, and steering motors connected to said arms inwardly of said pivots and carried on said substructure for shifting said arms to pivot said arms about a vertical axis for varying the position of the third and fourth tracklaying units for steering.

3. A tracklaying vehicle comprising first and second laterally spaced tracklaying units, third and fourth laterally spaced tracklaying units spaced longitudinally from said first and second tracklaying units, a substructure supported on said tracklaying units and mounted between said first and second and third and fourth units, a carrier shaft on said substructure extending in the travel direction, a crossbeam having a bore receiving said carrier shaft and being rotatably mounted on said carrier shaft between said first and second tracklaying units and interconnecting said first and second tracklaying units, a slide guide connected to each arm, said drive motors including fluid pressure operated pistons and cylinders connected to said slide guide for shifting said arms to pivot them about respective vertical axes.

4. A tracklaying vehicle comprising first and second laterally spaced tracklaying units, third and fourth laterally spaced tracklaying units spaced longitudinally from said first and second tracklaying units, a substructure supported on said tracklaying units and mounted between said first and second and third and fourth units, a carrier shaft on said substructure extending in the travel direction, a crossbeam having a bore receivng said carrier shaft and being rotatably mounted on said carrier shaft between said first and second tracklaying units and interconnecting said first and second tracklaying units, a portion of said substructure extending outwardly from each side thereof and overlying said crossbeam and limiting pivotal movement thereof on said carrier shaft.

* * * * *